(12) United States Patent
Hattori

(10) Patent No.: US 10,924,616 B2
(45) Date of Patent: Feb. 16, 2021

(54) IMAGE PROCESSING APPARATUS, IMAGE PROCESSING METHOD, AND NON-TRANSITORY STORAGE MEDIUM STORING INSTRUCTIONS EXECUTABLE BY THE IMAGE PROCESSING APPARATUS HAVING A SHORTCUT FUNCTION

(71) Applicant: BROTHER KOGYO KABUSHIKI KAISHA, Nagoya (JP)

(72) Inventor: Yuka Hattori, Mizuho (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/823,095

(22) Filed: Mar. 18, 2020

(65) Prior Publication Data

US 2020/0304659 A1 Sep. 24, 2020

(30) Foreign Application Priority Data

Mar. 19, 2019 (JP) ................. 2019-051543

(51) Int. Cl.
*H04N 1/00* (2006.01)
(52) U.S. Cl.
CPC ..... *H04N 1/00474* (2013.01); *H04N 1/00456* (2013.01); *H04N 1/00477* (2013.01); *H04N 1/00482* (2013.01)

(58) Field of Classification Search
CPC ........... H04N 1/00474; H04N 1/00477; H04N 1/00456; H04N 1/00482
See application file for complete search history.

(56) References Cited

U.S. PATENT DOCUMENTS 6,633,410 B1 10/2003 Narushima
2020/0304660 A1* 9/2020 Shen .................... H04N 1/0044

FOREIGN PATENT DOCUMENTS

JP 2000-66860 A 3/2000

* cited by examiner

*Primary Examiner* — Juan M Guillermety
(74) *Attorney, Agent, or Firm* — Merchant & Gould P.C.

(57) ABSTRACT

An image processing apparatus includes a controller configured to: set a type of a reading-related function to a first type or a second type; when the second type is set, display a procedure-selection screen prompting for selection of a first procedure or a second procedure as an execution procedure after a start of image reading; set the execution procedure to the first procedure or the second procedure; and register the reading-related function having a setting processing, a reading processing, and a particular processing. In the first procedure, the controller displays a first preview screen containing the read image, and the image processing apparatus starts the particular processing when a particular-processing start instruction is accepted. In the second procedure, the controller displays a second preview screen containing the read image, and the image processing apparatus starts the particular processing without accepting the particular-processing start instruction.

12 Claims, 7 Drawing Sheets

IMAGE PROCESSING APPARATUS, IMAGE PROCESSING METHOD, AND NON-TRANSITORY STORAGE MEDIUM STORING INSTRUCTIONS EXECUTABLE BY THE IMAGE PROCESSING APPARATUS HAVING A SHORTCUT FUNCTION

CROSS REFERENCE TO RELATED APPLICATION

The present application claims priority from Japanese Patent Application No. 2019-051543, which was filed on Mar. 19, 2019, the disclosure of which is herein incorporated by reference in its entirety.

BACKGROUND

The following disclosure relates to a technique of processing a read image.

There is known a printing apparatus which controls a display device to display an image read by a reading device and prints the image in response to a print instruction.

SUMMARY

One example of such a printing apparatus having a function of reading an image and a function of processing the read image (printing the image, for example) is a printing apparatus having a shortcut function. In the shortcut function, a particular function and parameters to be used for performing the particular function are registered in advance as a shortcut, and when a user provides an instruction for implementation of the shortcut, the registered function is performed using the registered parameters.

The shortcut can be broadly classified into two types according to whether a user operation is further required after the implementation instruction. In the first type, when the implementation instruction is received from the user, operations of the user for the parameters, such as a check and a change, are temporarily accepted, and thereafter the registered function is performed when an implementation instruction is thereafter further received from the user. In the second type, when the implementation instruction is received from the user, the registered function is performed without a further user operation after the reception of the implementation instruction.

Here, it is assumed that a shortcut containing a preview function for displaying a preview screen for the read image is registered as the second type. In this case, in the case where the shortcut is configured to receive the implementation instruction from the user after the preview screen is displayed, requirement of a further implementation instruction after the display of the preview screen may annoy a user who wants to cause the printing apparatus to perform the function by a single implementation instruction in an early stage. In the case where the shortcut is registered as the second type even in the case of the shortcut containing the preview function, a better usability is given to such a user by performing the function without requirement of a further operation even when the preview screen is displayed.

In the case where the shortcut contains the preview function even in the case of the shortcut registered as the second type, it is expected that some users want to provide the implementation instruction after checking the preview screen even if the number of operations increases. There is a possibility that these users do not feel a good usability for the configuration in which the function continues regardless of user's intention after the preview screen is displayed.

Accordingly, an aspect of the disclosure relates to an image processing apparatus that allows registration of a particular function including a processing to be executed using a set particular parameter to read an image to display a preview screen for the image and that improves the usability for both of a user who wants to perform the particular function to its end by a single implementation instruction and a user who wants to temporarily stop the processing during display of the preview screen and continue the processing in response to a further implementation instruction.

In one aspect of the disclosure, an image processing apparatus includes: a reading device; a display device; an input interface; and a controller configured to execute: a type setting processing in which the controller sets a type of a reading-related function to be performed according to a set parameter, to one of a first type and a second type, the first type being a type in which the reading-related function is to be started in response to acceptance of a start instruction for the reading-related function via the input interface after an input of selection of the reading-related function to be performed, the second type being a type in which the reading-related function is to be started without accepting the start instruction via the input interface after the input of the selection of the reading-related function to be performed; a procedure-selection display processing in which when the second type is set in the type setting processing, the controller controls the display device to display a procedure-selection screen prompting for selection of one of a first procedure and a second procedure as an execution procedure that is a procedure of execution of a processing after reading of an image is started in performing of the reading-related function; a procedure setting processing in which the controller sets the execution procedure to one of the first procedure and the second procedure in accordance with a selecting operation input via the input interface when the procedure-selection screen is displayed; and a registration processing in which the controller registers the reading-related function. The reading-related function has (i) a setting processing in which the controller sets a parameter to be implemented in the reading-related function, (ii) a reading processing in which the reading device reads the image, and (iii) a particular processing based on data representing a read image that is the image read in the reading processing. The first procedure is a procedure in which the controller controls the display device to display a first preview screen containing the read image, and the image processing apparatus starts the particular processing when a particular-processing start instruction for instructing a start of the particular processing is accepted via the input interface with the first preview screen being displayed. The second procedure is a procedure in which the controller controls the display device to display a second preview screen containing the read image, and the image processing apparatus starts the particular processing without accepting the particular-processing start instruction via the input interface.

Another aspect of the disclosure relates to an image processing method usable for an image processing apparatus. The image processing method includes: a type setting step of setting a type of a reading-related function to be performed according to a set parameter, to one of a first type and a second type, the first type being a type in which the reading-related function is to be started in response to acceptance of a start instruction for the reading-related function after an input of selection of the reading-related function to be performed, the second type being a type in which the reading-related function is to be started without accepting the start instruction after the input of the selection of the reading-related function to be performed; a procedure-selection display step of, when the second type is set in the type setting step, displaying a post-reading-procedure selection screen prompting for selection of one of a first procedure and a second procedure as an execution procedure that is a procedure of execution of a processing after reading of an image is started in performing of the reading-related function; a post-reading-procedure setting step of setting the execution procedure to one of the first procedure and the second procedure in accordance with a selecting operation input when the post-reading-procedure selection screen is displayed; and a registration step of registering the reading-related function. The reading-related function has (i) a setting processing for setting a parameter to be implemented in the reading-related function, (ii) a reading processing for reading the image, and (iii) a particular processing based on data representing a read image that is the image read in the reading processing. The first procedure is a procedure of displaying a first preview screen containing the read image, and starting the particular processing when a particular-processing start instruction for instructing a start of the particular processing is accepted with the first preview screen being displayed. The second procedure is a procedure of displaying a second preview screen containing the read image, and starting the particular processing without accepting the particular-processing start instruction.

In yet another aspect of the disclosure, a non-transitory storage medium stores a plurality of instructions executable by a processor of an image processing apparatus including a reading device, a display device, and an input interface. The plurality of instructions, when executed by the processor, cause the image processing apparatus to execute: a type setting processing in which the image processing apparatus sets a type of a reading-related function to be performed according to a set parameter, to one of a first type and a second type, the first type being a type in which the reading-related function is to be started in response to acceptance of a start instruction for the reading-related function via the input interface after an input of selection of the reading-related function to be performed, the second type being a type in which the reading-related function is to be started without accepting the start instruction via the input interface after the input of the selection of the reading-related function to be performed; a procedure-selection display processing in which when the second type is set in the type setting processing, the image processing apparatus controls the display device to display a procedure-selection screen prompting for selection of one of a first procedure and a second procedure as an execution procedure that is a procedure of execution of a processing after reading of an image is started in performing of the reading-related function; a procedure setting processing in which the image processing apparatus sets the execution procedure to one of the first procedure and the second procedure in accordance with a selecting operation input via the input interface when the procedure-selection screen is displayed; and a registration processing in which the image processing apparatus registers the reading-related function. The reading-related function has (i) a setting processing in which the image processing apparatus sets a parameter to be implemented in the reading-related function, (ii) a reading processing in which the reading device reads the image, and (iii) a particular processing based on data representing a read image that is the image read in the reading processing. The first procedure is a procedure in which the image processing apparatus controls the display device to display a first preview screen containing the read image, and the image processing apparatus starts the particular processing when a particular-processing start instruction for instructing a start of the particular processing is accepted via the input interface with the first preview screen being displayed. The second procedure is a procedure in which the image processing apparatus controls the display device to display a second preview screen containing the read image, and the image processing apparatus starts the particular processing without accepting the particular-processing start instruction via the input interface.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Hereinafter, there will be described one embodiment by reference to the drawings.

Configuration of Image Processing System

Figure 1:
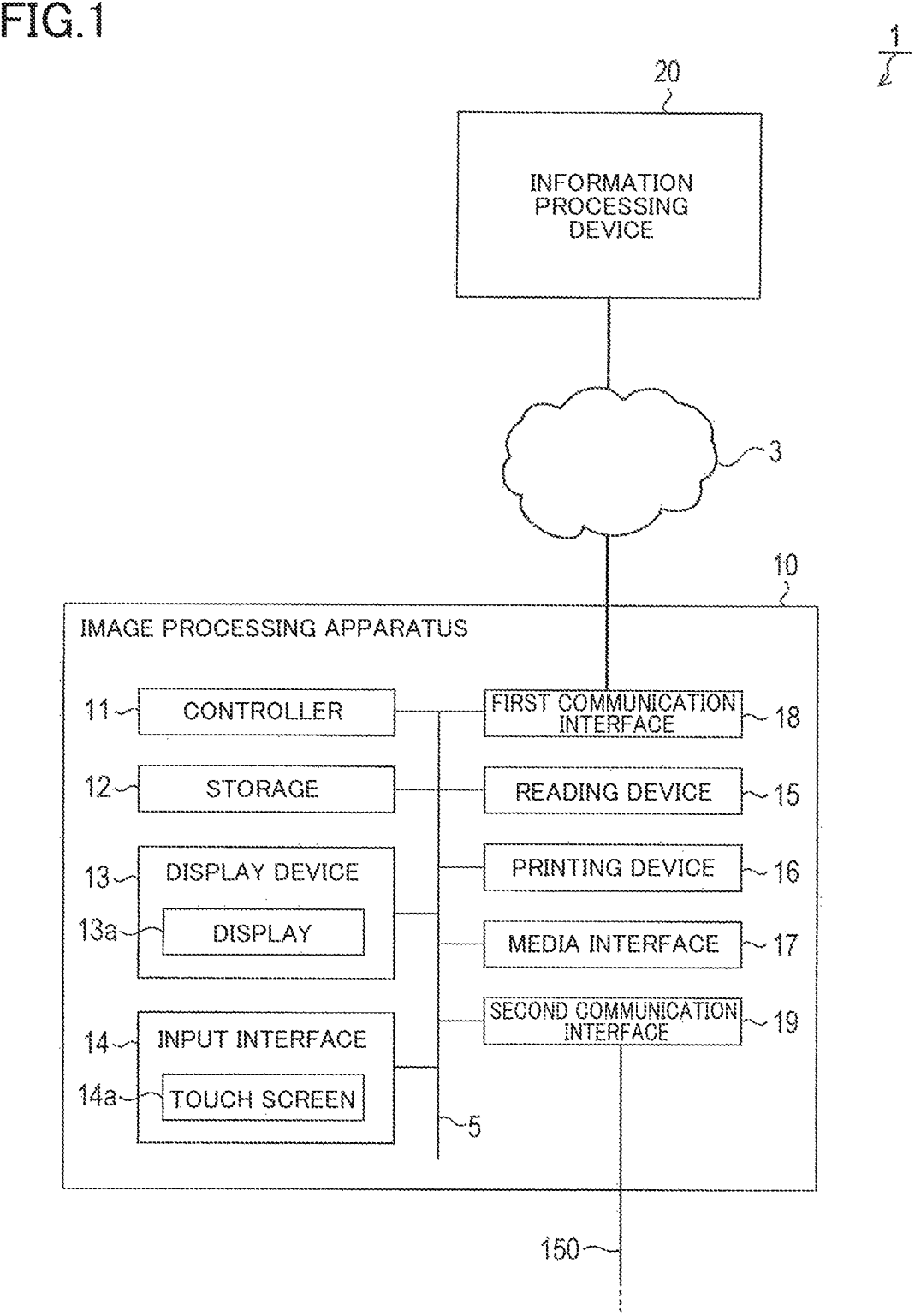
FIG. 1 is a view for explaining a configuration of an image processing system in one embodiment.

As illustrated in FIG. 1, an information processing system 1 includes an image processing apparatus 10 according to the present embodiment and an information processing device 20. The image processing apparatus 10 and the information processing device 20 are capable of performing data communication with each other over a network 3. The network 3 may be any network. The network 3 may be any of a wired network and a wireless network, for example. Each of the wired network and the wireless network may employ any communication standard.

Configuration of Image Processing Apparatus

The image processing apparatus 10 according to the present embodiment in FIG. 1 has a plurality of functions including a scanning function, a printing function, a copying function, and a facsimile function, for example. The scanning function is a function for reading an image formed on a document to create image data based on the read image. Hereinafter, the read image and the image data based on the read image may be hereinafter referred to as "scanned image" and "scanned data", respectively. The printing function is a function for printing an image on a recording sheet. The copying function is a function using the printing function to print an image read in the scanning function. The facsimile function is a function for transmitting and receiving facsimile data.

As illustrated in FIG. 1, the image processing apparatus 10 includes a controller 11, a storage 12, a display device 13, an input interface 14, a reading device 15, a printing device 16, a media interface 17, a first communication interface 18, and a second communication interface 19, which are connected to each other via a bus 5.

The controller 11 includes a central processing unit (CPU), for example. The storage 12 includes semiconductor memories including a read-only memory (ROM), a random-access memory (RAM), a nonvolatile random access memory (NVRAM), and a flash memory, for example. That is, the image processing apparatus 10 according to the present embodiment includes a microcomputer including the CPU and the semiconductor memories.

The controller 11 performs various functions by executing programs stored in a non-transitory storage medium. In the present embodiment, the storage 12 is one example of the non-transitory storage medium storing the programs. It is noted that the various functions to be performed by the controller 11 are not limited to those performed by execution of the programs (i.e., a software processing), and some or all of the functions may be performed using one or more hardware devices.

The storage 12 stores data relating to various screens including screens illustrated in FIGS. 2-5. The storage 12 further stores programs for a shortcut registering process illustrated in FIG. 6 and programs for a shortcut activating process illustrated in FIG. 7.

The display device 13 in the present embodiment includes a display 13a for displaying various kinds of information. The input interface 14 includes an input device for accepting various input operations. In the present embodiment, the input interface 14 includes a touch screen 14a as the input device. The touch screen 14a is superposed on an image display region of the display device 13. The image display region is a region on which an image is to be displayed.

The touch screen 14a superposed on the image display region of the display device 13 is configured to detect an instructing operation that is a touch or an approach of an input object on or to the image display region. That is, in the case where a user is performing the instructing operation with the input object relative to the image display region, the touch screen 14a can output positional information representing an instructed position at which the user is performing the instructing operation. In the present embodiment, the touch screen 14a is configured to continuously or periodically output the positional information while the instructing operation is being performed with the input object.

It is noted that the touch screen 14a may be configured to detect any of only a touch of the input object, only an approach of the input object, and both of a touch and an approach of the input object as the instructing operation.

The controller 11 is configured to obtain the positional information output from the touch screen 14a and based on the obtained positional information detect (i) the presence or absence of the instructing operation with the input object, (ii) the instructed position in the case where the user is performing the instructing operation, and (iii) at least one type of a specific operation with the input object in the case where the user is performing the instructing operation.

Examples of the specific operation detectable by the controller 11 include a tap, a flick, and a drag. The tap is an operation in which, after the instructing operation is performed with the input object, the input object moves off or away from the touch screen 14a at the same position. Examples of the input object to be used for the instructing operation include a fingertip and a particular instructing device such as a stylus.

The reading device 15 includes an image sensor and is configured to read an image formed on a document to create scanned data of the read (scanned) image. The image sensor may be any of a charge-coupled-device (CCD) image sensor and a complementary-metal-oxide-semiconductor (CMOS) image sensor, for example. The document may be any of at least one of a paper sheet, a cloth, and a label, for example.

It is noted that the image processing apparatus 10 includes a document table, not illustrated, for supporting a document. The reading device 15 is configured to read an image formed on the document placed on the document table. The image processing apparatus 10 may include an automatic document feeder (ADF). The reading device 15 may be configured to perform what is called duplex scanning for reading images on both sides of the document set on the ADF.

The printing device 16 includes an ink-jet or electrophotographic printing mechanism and is capable of printing an image on the recording sheet. For example, the media interface 17 is an interface on which at least one of various storage media such as a USB flash memory is to be mounted. The media interface 17 controls writing and reading of data into or from the mounted storage medium.

The first communication interface 18 is a communication interface capable of connecting the image processing apparatus 10 to the network 3. The image processing apparatus 10 is capable of performing data communication via the first communication interface 18 with various information processing devices including the information processing device 20. The image processing apparatus 10 is connectable to the Internet via the first communication interface 18 to perform data communication over the Internet with other various servers and/or various information processing devices, for example.

The second communication interface 19 is an interface for communicating with an external device over a communication network 150. The communication network 150 connected to the second communication interface 19 is a public telephone network in the present embodiment, for example. Transmission and reception of facsimile data in the facsimile function are principally performed via the second communication interface 19.

The scanning function is principally performed by control of the reading device 15 by the controller 11. Specifically, the scanning function in the present embodiment includes a plurality of sub-functions each relating to a method of processing the scanned data. Examples of the sub-functions include a scan-to-USB-memory function, a scan-to-PC function, and a scan-to-email-transmission function. The scan-to-USB-memory function is a function for outputting and storing the scanned data into the USB memory connected to the media interface 17. The scan-to-PC function is a function of transmitting the scanned data to another information processing device connected to the image processing apparatus 10. The scan-to-email-transmission function is a function of transmitting the scanned data by an electronic mail.

The copying function is principally performed by control of the reading device 15 and the printing device 16 by the controller 11. That is, the controller 11 obtains the scanned data by controlling the reading device 15 to read an image formed on the document, i.e., by performing the scanning function. The controller 11 thereafter outputs a printed material by controlling the printing device 16 to perform printing based on the scanned data, i.e., by performing the printing function. The printed material is a recording sheet on which the scanned image is printed.

Overview of Information Processing Device 20

The information processing device 20, for example, is an information processing terminal such as a personal computer, a tablet computer, and a smartphone. The information processing device 20 is capable of performing data communication with the image processing apparatus 10. The information processing device 20 is capable of creating image data and transmitting the image data to the image processing apparatus 10, allowing the image processing apparatus 10 to print an image based on the image data. Also, the image processing apparatus 10 is capable of transmitting the scanned data created in the scanning function to the information processing device 20.

Explanation of Shortcut

Figure 2:
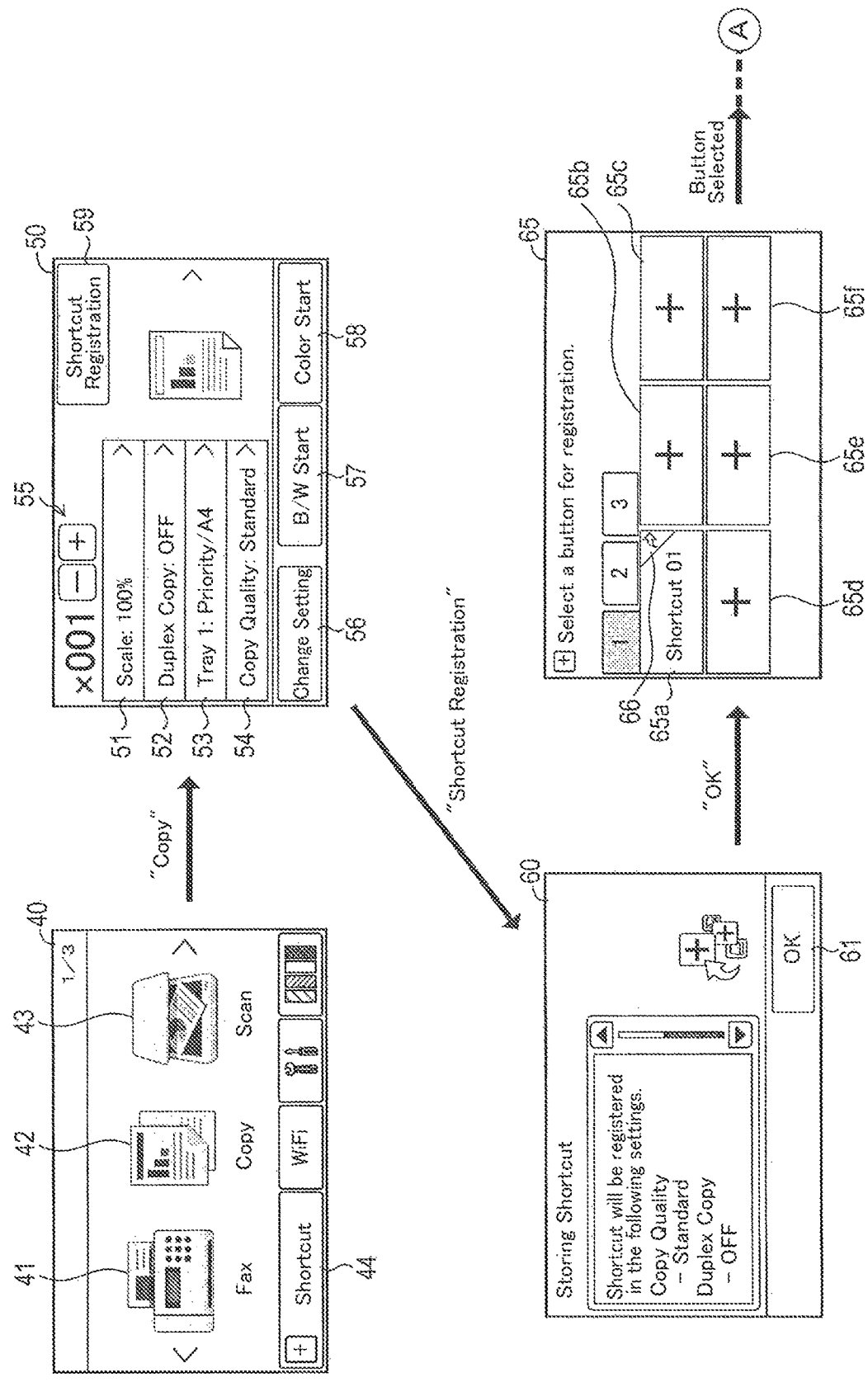
FIG. 2 is a view for explaining portions of screen transition in registration of a shortcut.

When the image processing apparatus 10 is turned on, and the controller 11 is activated, the controller 11 controls the display device 13 to display a waiting screen 40 illustrated in FIG. 2. The waiting screen 40 functions as a start-off screen when the user uses the image processing apparatus 10 to perform various functions. The waiting screen 40 contains a plurality of function buttons each for performing a corresponding one of the functions.

The waiting screen 40 illustrated in FIG. 2 contains a Fax button 41, a Copy button 42, and a Scan button 43 as the plurality of function buttons by way of example. When the Fax button 41 is selected, the controller 11 performs the facsimile function. When the Copy button 42 is selected, the controller 11 performs the copying function. When the Scan button 43 is selected, the controller 11 performs the scanning function. The selecting operation may be any operation and is a tap in the present embodiment, for example.

The waiting screen 40 contains a Shortcut button 44. When the Shortcut button 44 is selected, a shortcut screen 80 (see, e.g., FIGS. 3 and 4) is displayed. The shortcut screen 80 is a tab-style screen on which a plurality of shortcut buttons are associated with each tab. For example, six shortcut buttons 65a-65f are associated with each tab in the present embodiment. The shortcut screen 80 contains the shortcut buttons 65a-65f corresponding to one tab being in a selected state.

Figure 3:
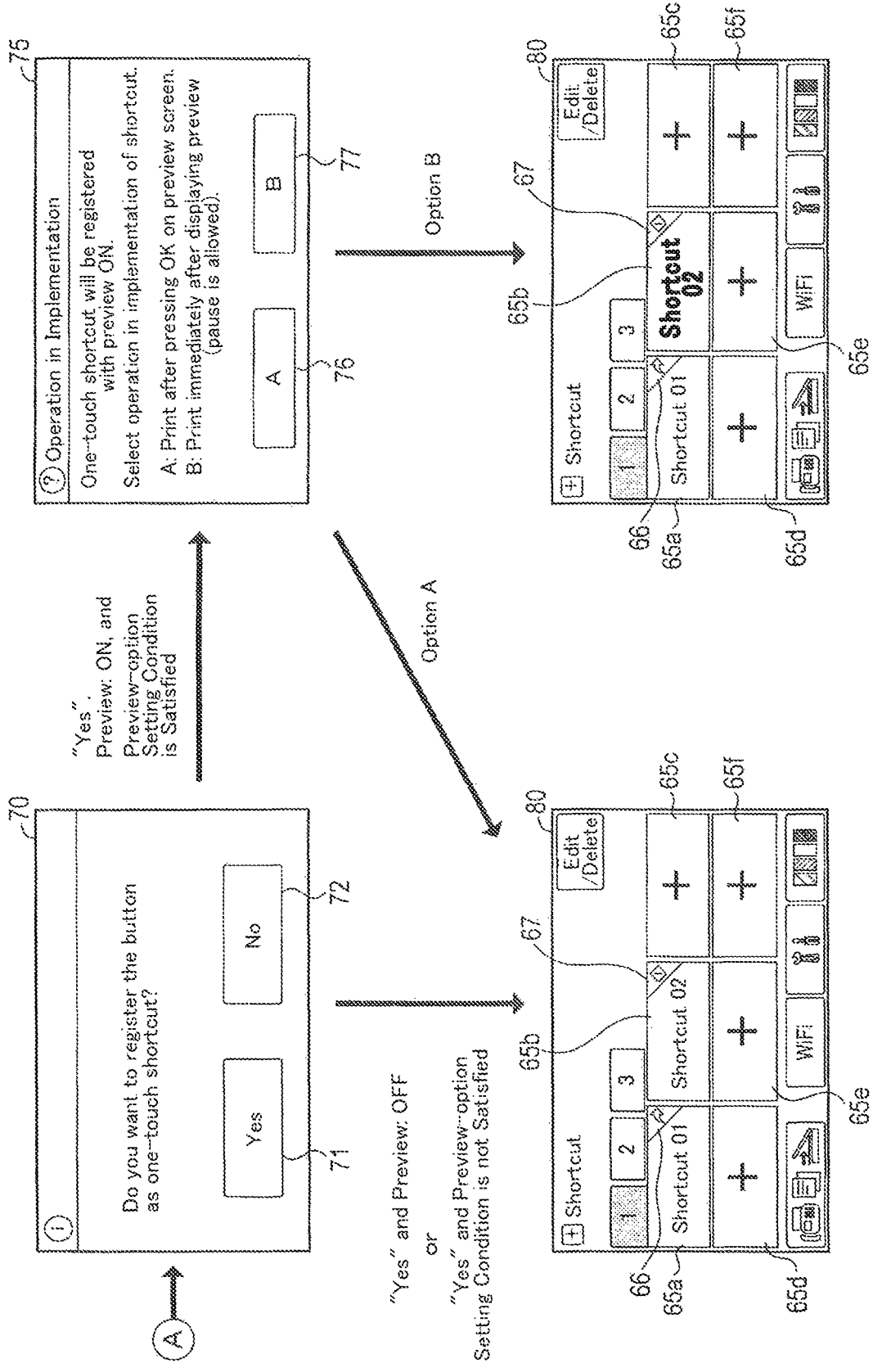
FIG. 3 is a view for explaining other portions of the screen transition (continued from FIG. 2) in registration of the shortcut.

On the shortcut screen 80 in FIG. 3, each of the shortcut buttons 65a, 65b is a registered shortcut button with which a shortcut has already been registered. Each of the other four shortcut buttons 65c-65f is an unregistered shortcut button with which no shortcut has been registered. The user can register a shortcut with the unregistered shortcut button.

The shortcut is a function for performing a particular one of the functions of the image processing apparatus 10, using parameters set in advance. The user can register a function and parameters frequently used, with one of the shortcut buttons as a shortcut. In this case, when the shortcut button is thereafter selected, the shortcut can be implemented readily.

Examples of parameters registerable with a shortcut including the copying function include parameters for various setting items such as the copy image quality, the sheet type, the sheet size, selection of the sheet tray, enlargement or reduction, the copy density, and duplex copy. Examples of parameters registerable with a shortcut for the facsimile function include parameters for various setting items such as the destination of transmission, the facsimile image quality, duplex facsimile, the document density, the document size, and the color setting.

The functions each registerable as a shortcut include various reading-related functions. The reading-related functions include: a scan processing for creating the scanned data by controlling the reading device 15 to read an image formed on the document; and a post-scanning processing based on the scanned data created in the scan processing. Each of the copying function, the scanning function, and the facsimile function is one of the reading-related functions. In the post-scanning processing in the copying function, an image is printed on the recording sheet. The post-scanning processing in the scanning function varies with the sub-function described above, for example. In the post-scanning processing in the scan-to-USB-memory function, for example, the scanned data is stored into the USB memory. In the post-scanning processing in the facsimile function, the scanned data is transmitted by facsimile as facsimile data. In the following description, the shortcut for each of the reading-related functions may be referred to as "reading-related shortcut".

In the present embodiment, the shortcuts are classified into two types, namely, a normal shortcut and a one-touch shortcut. In the case where an implementation instruction is input to the normal shortcut by the user, that is, in the case where a corresponding shortcut button is selected, the shortcut registered with the shortcut button is not implemented immediately, and a setting screen indicating the parameters corresponding to the shortcut is displayed. The setting screen allows the user to check the parameters of the shortcut to be implemented. The user can change the parameters as needed. When the user operates the setting screen to instruct a start of performing of the function, implementation of the shortcut is started.

It is noted that a preview function can be set to ON or OFF in the reading-related shortcut as will be described below. In the preview function, after an image is read in the scan processing and before the post-scanning processing is started based on the scanned data, the display device 13 displays a preview screen containing a preview image representing the scanned image.

The preview image may be any image representing the scanned image. The preview image may contain only the scanned image, for example. In the case where the post-scanning processing includes printing of the scanned image as in the shortcut for the copying function, for example, the preview image may be an image representing a state in which the scanned image is printed on the recording sheet, i.e., an image including an outline of the recording sheet and the scanned image disposed within a region enclosed by the outline (i.e., within a region corresponding to the recording sheet). The display device 13 may display the entirety or a portion of the scanned image. The preview image may be moved in the display 13a and may be enlarged or reduced in size.

Figure 4:
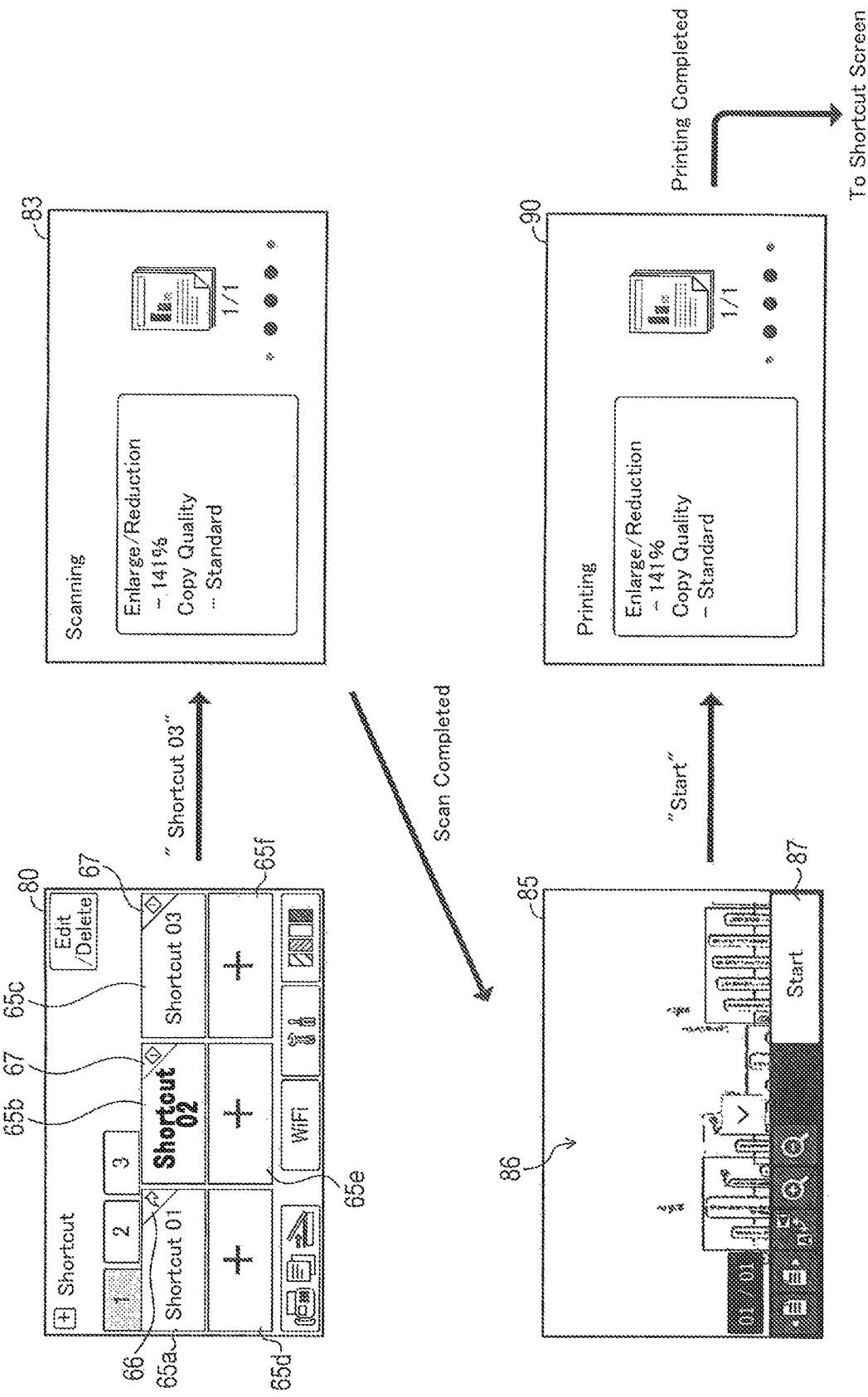
FIG. 4 is a view for explaining a first example of screen transition in implementation of a shortcut (in the case where an option A is set)

When the reading-related shortcut which is registered as the normal shortcut and in which the preview function is set at ON is implemented, a first preview screen 85 illustrated in FIG. 4 is displayed after an image formed on the document is read in the scan processing and before the post-scanning processing is started.

The first preview screen 85 contains a preview image 86 representing the scanned image, and a Start button 87. The user can view the preview image 86 to check whether the image formed on the document has been read appropriately. Also, when the user views the preview image 86 corresponding to the copying function and contains the outline of the recording sheet, the user before printing can check the position and the size of the scanned image to be printed on the recording sheet in reality. When the Start button 87 is selected on the first preview screen 85, the post-scanning processing is executed.

Thus, to complete implementation of the reading-related shortcut which is registered as the normal shortcut and in which the preview function is set at ON, the user needs to select the Start button 87 on the first preview screen 85 in addition to performing an operation of instructing a start of the function on the setting screen after the first implementation instruction.

In the case where the implementation instruction is input to the one-touch shortcut, that is, in the case where a corresponding shortcut button is selected, implementation of the shortcut registered with the shortcut button is principally completed without a further input operation of the user. For example, in the case where the function corresponding to the selected shortcut includes image reading by the reading device 15, the image reading is started in response to selection of the shortcut button.

In the case where the reading-related shortcut is registered as the one-touch shortcut in a state in which the preview function is set at ON, when a preview-option setting condition is satisfied, the user can further set a preview option to an option A or an option B. The preview option indicates an option of a procedure to be executed after the scan processing. The procedure to be executed after the scan processing varies according to whether the preview option is set to the option A or the option B.

In the case where the preview option is set to the option A, as will be described below, even when the reading-related shortcut is registered as the one-touch shortcut, the first preview screen 85 is displayed, and a state of waiting for the start of the post-scanning processing is established after the scan processing. When a start instruction is thereafter performed by the user, that is, when the Start button 87 is selected, the post-scanning processing is executed. That is, though the number of operations required for the user is reduced when compared with the case where the reading-related shortcut is registered as the normal shortcut, the user needs to perform an operation for starting the post-scanning processing, after the first preview screen 85 is displayed. For example, in the case where the post-scanning processing contained in the function corresponding to the shortcut includes image printing by the printing device 16, the reading device 15 starts reading an image in response to selection of the shortcut button, and thereafter the printing device 16 starts printing in response to selection of the Start button 87.

In the case where the preview option is set to the option B, as will be described below, a second preview screen 95 (see FIG. 5) is displayed, and the post-scanning processing is started after the scan processing.

The preview-option setting condition may be any condition. In the present embodiment, the preview-option setting condition, for example, includes a condition that the shortcut to be registered is the shortcut for the copying function, and the setting value of the stack/sort setting which will be described below is set at "Sort" (in other words, the setting value is not set at "Stack").

That is, in the present embodiment, even in the case where the reading-related shortcut is registered as the one-touch shortcut, and the preview function in the reading-related shortcut is set at ON, when the shortcut is the shortcut for the copying function, and the stack copy is set to be performed, the preview option cannot be set. In this case, when the shortcut is selected and implemented, processings are, after the scan processing, executed in a procedure substantially equivalent to that for the option A.

As illustrated in FIG. 3, the shortcut button with which the shortcut has been registered is displayed on the shortcut screen 80 with the name of the shortcut and a normal mark 66 or a one-touch mark 67. The normal mark 66 indicates that the shortcut button is associated with the normal shortcut. The one-touch mark 67 indicates that the shortcut button is associated with the one-touch shortcut.

Example of Screen Transition in Registration of Reading-Related Shortcut

There will be next described, with reference to FIGS. 2 and 3, an example of screen transition in registration of the reading-related shortcut. Registration of the shortcut can be started by selecting any of the function buttons on the waiting screen 40 or selecting the Shortcut button 44. Here, there will be described, by way of example, the case where the Copy button 42 is selected to register the shortcut for the copying function.

When the Copy button 42 is selected, as illustrated in FIG. 2, a copy-setting screen 50 is displayed on the display device 13. The copy-setting screen 50 contains parameter display buttons respectively for setting items of a plurality of types. The parameter display buttons include a scaling-setting display button 51, a duplex-copy-setting display button 52, a tray-setting display button 53, and a copy-image-quality-setting display button 54, for example.

Displayed on the scaling-setting display button 51 is the current setting value of a copy scale that indicates an enlargement/reduction ratio to be used for printing of the scanned image on the recording sheet. Displayed on the duplex-copy-setting display button 52 is the current setting value of a duplex-copy setting that indicates whether the scanned image or images are to be printed on one side or both sides of the recording sheet. Displayed on the tray-setting display button 53 is the current setting value of a tray being used which indicates a tray supporting the recording sheet to be used for printing of the scanned image. Displayed on the copy-image-quality-setting display button 54 is the current setting value of a copy image quality that indicates an image quality for printing of the scanned image on the recording sheet. The user can view each of the setting-value display buttons to check the current setting value of a corresponding one of the various setting items in the copying function.

In the present embodiment, the various setting items settable for performing of the copying function include not only the copy scale, the duplex-copy setting, the tray being used, and the copy image quality but also the number of copies, a sheet type, a sheet size, layout copy, stack/sort, and a preview setting, for example. The copy-setting screen 50 may contain parameter display buttons corresponding to other setting items.

It is noted that the preview setting is a setting item indicating ON or OFF of the preview function in the reading-related shortcut to be registered. When the preview setting is set to ON, the preview image is displayed after the scan processing. When the preview setting is set to OFF, the post-scanning processing is executed without the preview image being displayed after the scan processing. The parameter of the preview setting may be set at OFF by default, for example.

The stack/sort setting is a setting item indicating which of the stack copy and the sort copy is to be performed in the copying function registered as the reading-related shortcut. When the stack copy is set, the stack copy is performed. When the sort copy is set, the sort copy is performed. The parameter of the stack/sort setting may be set at the stack copy by default, for example.

The copy-setting screen 50 further contains a Change Setting button 56, a B/W Start button 57, a Color Start button 58, and a Shortcut Registration button 59. When the Change Setting button 56 is selected, a setting change screen, not illustrated, is displayed. The user can change parameters of the various setting items, using the setting change screen as a start-off screen.

When the B/W Start button 57 or the Color Start button 58 is selected on the copy-setting screen 50, the copying function is started. When the B/W Start button 57 is selected, an image formed on the document is printed in white and black. When the Color Start button 58 is selected, an image formed on the document is printed in color.

When the Shortcut Registration button 59 is selected on the copy-setting screen 50, as illustrated in FIG. 2, the display device 13 displays a shortcut-registration confirmation screen 60. The current parameters of the setting items are displayed on the shortcut-registration confirmation screen 60. The current parameters are parameters of the respective setting items at a time just before the Shortcut Registration button 59 is selected on the copy-setting screen 50.

When an OK button 61 is selected on the shortcut-registration confirmation screen 60, as illustrated in FIG. 2, the display device 13 displays a registration-button selection screen 65. Like the shortcut screen 80 (see FIG. 3), the registration-button selection screen 65 contains: a plurality of tabs each associated with shortcut buttons; and the shortcut buttons 65a-65f corresponding to one tab being in a selected state.

When one of unregistered shortcut buttons displayed on the registration-button selection screen 65 is selected, the unregistered shortcut button is set to a shortcut button with which the shortcut is to be registered. After an input of the name of the shortcut is accepted on a name setting screen, not illustrated, the display device 13 displays a one-touch-registration confirmation screen 70 illustrated in FIG. 3. It is noted that the following description for FIG. 3 is given, assuming that the shortcut button 65b is selected on the registration-button selection screen 65 in FIG. 2 by way of example.

The one-touch-registration confirmation screen 70 prompts the user to select which of the normal shortcut and the one-touch shortcut the shortcut is to be registered as. The one-touch-registration confirmation screen 70 contains a Yes button 71 and a No button 72.

In the case where the Yes button 71 is selected on the one-touch-registration confirmation screen 70, when the preview function is set at OFF or the preview-option setting condition is not satisfied, the reading-related shortcut to be registered is registered as the one-touch shortcut, and the shortcut screen 80 illustrated at the lower left region in FIG. 3 is displayed. In this example, a new reading-related shortcut is registered with the shortcut button 65b selected on the registration-button selection screen 65. In this case, since the reading-related shortcut is registered as the one-touch shortcut, the one-touch mark 67 is displayed on the shortcut button 65b.

In the case where the No button 72 is selected on the one-touch-registration confirmation screen 70, the reading-related shortcut to be registered is registered as the normal shortcut, and the shortcut screen 80 is displayed. On the shortcut screen 80, not illustrated, displayed in this case, the normal mark 66 is displayed on the shortcut button 65b.

In the case where the Yes button 71 is selected on the one-touch-registration confirmation screen 70, when the preview function is set at ON, and the preview-option setting condition is satisfied, a preview-option selection screen 75 in FIG. 3 is displayed. The preview-option selection screen 75 prompts the user to set the preview option to the option A or the option B.

The preview-option selection screen 75 contains: brief explanations for the option A and the option B; and an A button 76 and a B button 77. When the A button 76 is selected, the reading-related shortcut to be registered is registered as the one-touch shortcut, and the preview option is set to the option A, and the shortcut screen 80 located at the lower left region in FIG. 3 is displayed.

When the B button 77 is selected, the reading-related shortcut to be registered is registered as the one-touch shortcut, and the preview option is set to the option B, and the shortcut screen 80 located at the lower right region in FIG. 3 is displayed. Also in this case, since the reading-related shortcut is registered as the one-touch shortcut, the one-touch mark 67 is displayed on the shortcut button 65b. Furthermore, in this case, since the preview option is set to the option B, the name of the shortcut button 65b is displayed in a manner different from the manner in which the name of the shortcut button 65b is displayed in the case where the preview option is set to the option A. In the present embodiment, for example, the font of the characters is different from that in the case of the option A as is clear when compared with the shortcut screen 80 located at the lower left region in FIG. 3.

By checking whether the shortcut button contains the normal mark 66 or the one-touch mark 67, the user can recognize that the shortcut registered with the shortcut button is the normal shortcut or the one-touch shortcut. In the case where the one-touch shortcut has been registered, the user can recognize whether the preview option is set at the option B, by viewing the font of the characters indicating the name of the shortcut. That is, the user can recognize that the reading-related shortcut with the preview option set at the option B has been registered by viewing the font of the characters on the shortcut button 65b illustrated at the lower right region in FIG. 3, for example. In contrast, by viewing the font of the characters on the shortcut button 65b illustrated at the lower left region in FIG. 3, for example, the user can recognize that the shortcut registered with the shortcut button 65b is different from the reading-related shortcut with the preview option set at the option B.

Example of Screen Transition in Implementation of One-Touch Shortcut

Figure 5:
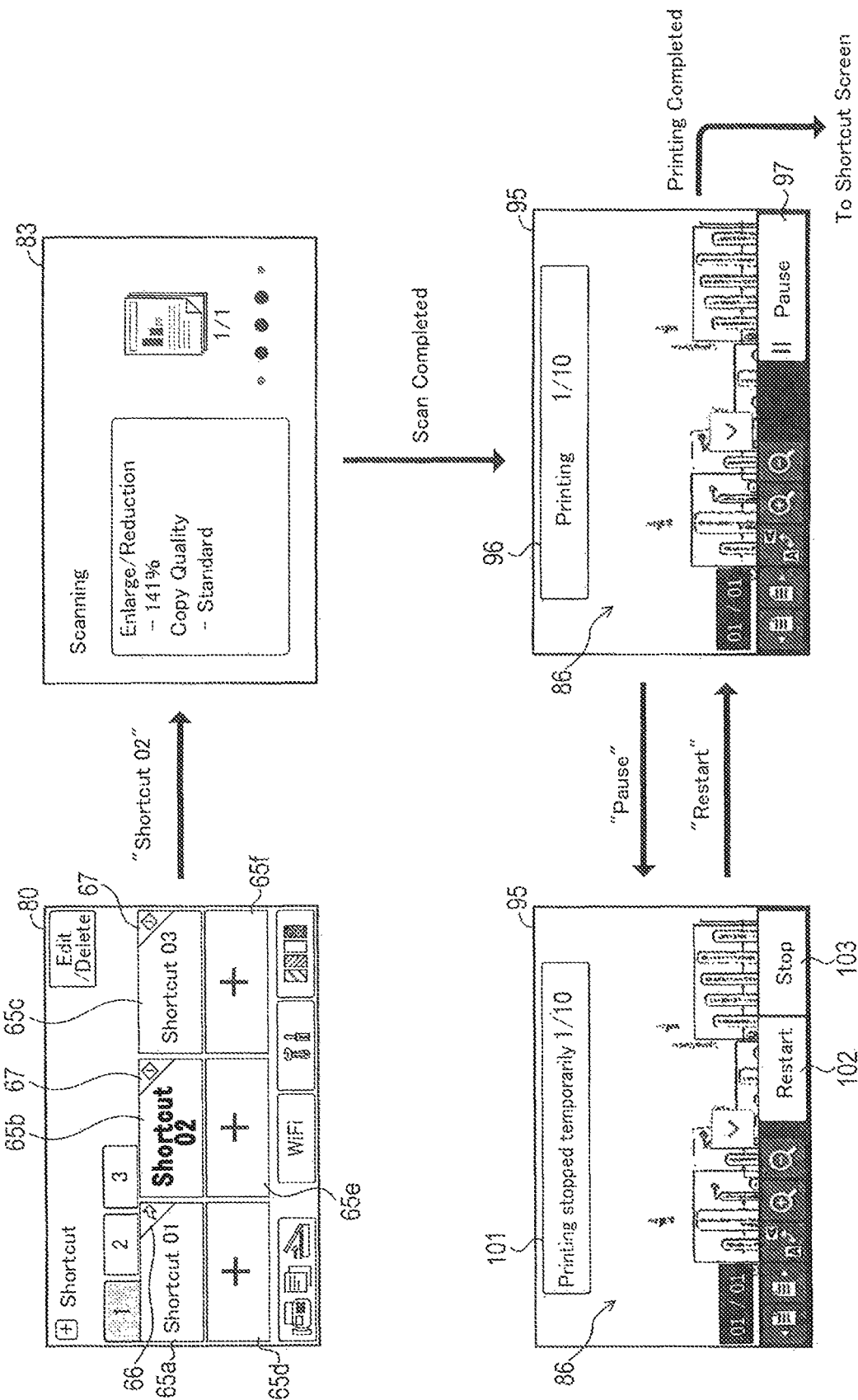
FIG. 5 is a view for explaining a second example of screen transition in implementation of a shortcut (in the case where an option B is set)

There will be next described, with reference to FIGS. 4 and 5, an example of screen transition in implementation of the reading-related shortcut. On the shortcut screen 80 illustrated in FIGS. 4 and 5, the shortcut for the copying function which is the reading-related shortcut with the preview option set at the option B is registered with the shortcut button 65b, and the shortcut for the copying function which is the reading-related shortcut with the preview option set at the option A is registered with the shortcut button 65c, by way of example.

There will be described, with reference to FIG. 4, an example of screen transition in the case where the shortcut button 65c is selected, that is, in the case where the reading-related shortcut with the preview option set at the option A is to be implemented.

When the shortcut button 65c is selected, as illustrated in FIG. 4, the registered shortcut is started. In this case, since the shortcut is registered as the one-touch shortcut, the scan processing is started without displaying the setting screen, i.e., without requiring the user to operate the setting screen. A scanning-state screen 83 is displayed on the display device 13 during execution of the scan processing.

When the scan processing is completed, the display device 13 displays the first preview screen 85. In this case, as in the case of the normal shortcut, when the preview option is set at the option A, the state of waiting for the start of the post-scanning processing is established. When the Start button 87 is thereafter selected, the post-scanning processing is executed.

In the present embodiment, in the case where no-operation time-out has occurred after the first preview screen 85 is displayed, the post-scanning processing is executed without selection of the Start button 87. For example, the no-operation time-out is a passage of a particular length of time without selection of the Start button 87 after the first preview screen 85 is displayed.

During execution of the post-scanning processing, the display device 13 displays a post-scanning-processing executing-state screen 90 indicating that the post-scanning processing is being executed. After the completion of the post-scanning processing, i.e., the completion of the reading-related shortcut, the display device 13 displays the shortcut screen 80.

It is noted that, in the case where the preview option is set at the option A, the post-scanning processing is started in response to the no-operation time-out after the first preview screen 85 is displayed. In the case where the first preview screen 85 is displayed during implementation of the reading-related shortcut with the preview option being not set (e.g., the reading-related shortcut registered as the normal shortcut), the post-scanning processing is not executed even when a no-operation state is continued for a time greater than or equal to the particular length of time.

There will be described, with reference to FIG. 5, an example of screen transition in the case where the shortcut button 65b is selected, that is, in the case where the reading-related shortcut with the preview option set at the option B is to be implemented.

As illustrated in FIG. 5, when the shortcut button 65b is selected, implementation of the registered shortcut is started. Also in this case, since the shortcut is registered as the one-touch shortcut, the scan processing is started without displaying the above-described setting screen, i.e., without requiring the user to operate the setting screen. The scanning-state screen 83 is displayed on the display device 13 during execution of the scan processing.

When the scan processing is completed, the display device 13 displays the second preview screen 95 illustrated at the lower right region in FIG. 5. In this case, when the preview option is set at the option B, the post-scanning processing is started. That is, the post-scanning processing is started without the need of the user operation after the scan processing.

The second preview screen 95 contains the preview image 86, an executing-state message 96, and a Pause button 97. The preview image 86 is the same as the first preview screen 85 (see FIG. 4).

When the Pause button 97 is selected on the second preview screen 95, the post-scanning processing being executed is temporarily stopped. In the case where the shortcut for the copying function is being executed, for example, printing of the scanned image is temporarily stopped.

When the post-scanning processing being executed is temporarily stopped by the selection of the Pause button 97, as illustrated at the lower left region in FIG. 5, a Restart button 102 and a Stop button 103 are displayed on the second preview screen 95 instead of the Pause button 97. Also, a pause-state message 101 is displayed instead of the executing-state message 96.

When the Stop button 103 is selected, the post-scanning processing stopped temporarily is stopped completely. In this case, the screen displayed on the display device 13 is changed to the shortcut screen 80, for example.

When the Restart button 102 is selected, the post-scanning processing stopped temporarily is restarted. At this time, the second preview screen 95 is switched to a screen (see the lower right region in FIG. 5) containing the contents before the post-scanning processing is stopped temporarily, i.e., a screen containing the executing-state message 96 and the Pause button 97.

In the case where printing of the scanned image is temporarily stopped by selection of the Pause button 97, the timing of stopping printing may be any timing.

For example, when printing is immediately stopped at the time of selection of the Pause button 97, and thereafter the Restart button 102 is selected, printing may be restarted from the stopped position. Alternatively, printing may be immediately stopped at the time of selection of the Pause button 97 to discharge a recording sheet on which printing has been performed, for example. When the Restart button 102 is thereafter selected, printing may be restarted from printing of the image which is stopped midway therein.

In the case where the Pause button 97 is selected in the middle of printing on the recording sheet, for example, printing on the recording sheet may be continued until the end of the printing, and when the printing on the recording sheet is completed, printing on the next recording sheet may be stopped temporarily.

In the case where the printing device 16 includes the ink-jet printing mechanism, and in the case where the Pause button 97 is selected when a recording head, not illustrated, configured to eject ink onto the recording sheet is moving in the main scanning direction, for example, the movement and ink ejection of the recording head may be continued until the recording head is moved to a predetermined stop position in the main scanning direction.

Shortcut Registering Process

Figure 6:
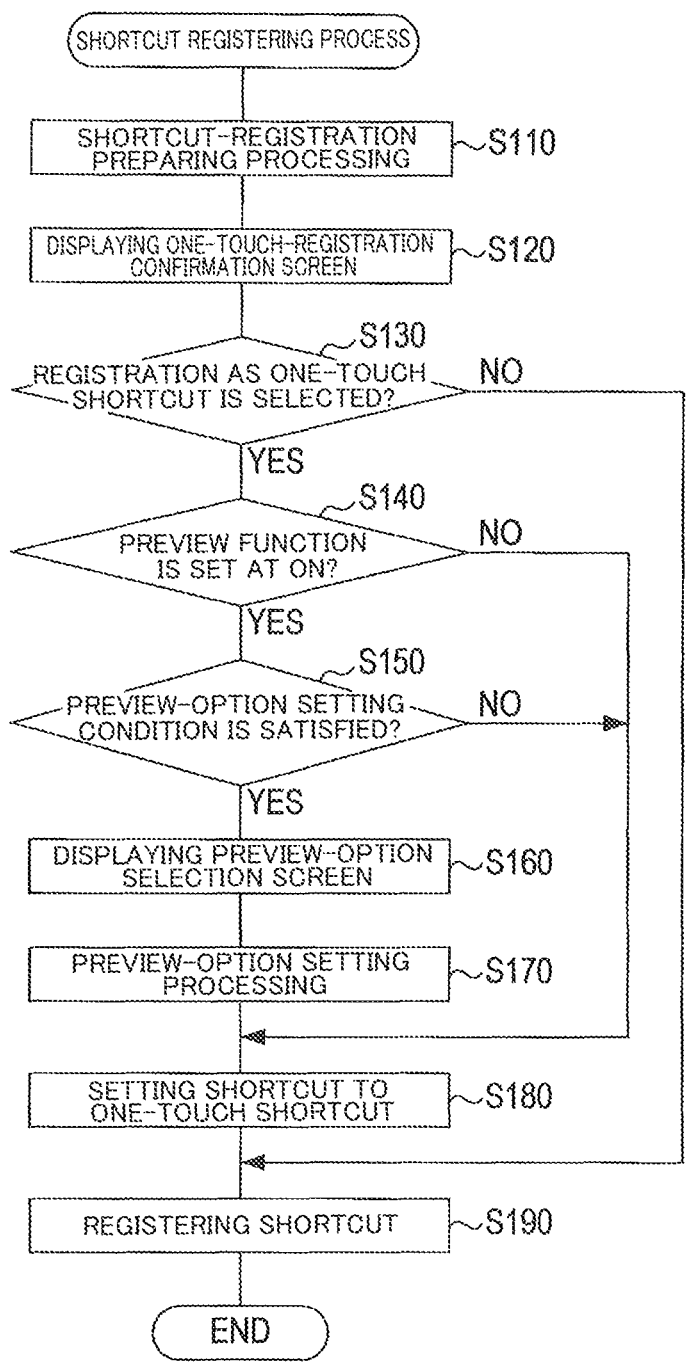
FIG. 6 is a flowchart representing a shortcut registering process.

There will be next described the shortcut registering process executable by the controller 11 with reference to FIG. 6. The controller 11 starts the shortcut registering process in FIG. 6 when the Shortcut Registration button 59 is selected on a screen for setting of a function (e.g., the copy-setting screen 50 in FIG. 2 in the case of the copying function). The examples of the screen transitions in FIGS. 2 and 3 are implemented by execution of the shortcut registering process by the controller 11.

When the shortcut registering process is started, the controller 11 executes a shortcut-registration preparing processing at S110. Specifically, the controller 11 obtains parameters set on the function setting screen and controls the display device 13 to display the shortcut-registration confirmation screen 60 (see FIG. 2) containing information indicating the parameters. When the OK button 61 is selected, the controller 11 displays the registration-button selection screen 65 (see FIG. 2). When an unregistered shortcut button is selected on the registration-button selection screen 65, this flow goes to S120.

The controller 11 at S120 displays the one-touch-registration confirmation screen 70 (see FIG. 3) on the display device 13. The controller 11 at S130 determines whether registration as the one-touch shortcut is selected. When the No button 72 is selected on the one-touch-registration confirmation screen 70, the controller 11 determines that registration as the normal shortcut is selected, and this flow goes to S190. At S190 in the case where the negative decision is made at S130, the controller 11 registers the shortcut with the selected unregistered shortcut button as the normal shortcut.

When the controller 11 determines at S130 that the Yes button 71 is selected on the one-touch-registration confirmation screen 70, the controller 11 determines that registration as the one-touch shortcut is selected, and this flow goes to S140.

The controller 11 at S140 determines whether the preview function is set at ON. When the preview function is set at OFF, this flow goes to S180. When the preview function is set at ON, this flow goes to S150.

The controller 11 at S150 determines whether the preview-option setting condition is satisfied. When the preview-option setting condition is not satisfied, this flow goes to S180. When the preview-option setting condition is satisfied, this flow goes to S160.

The controller 11 at S160 displays the preview-option selection screen 75 (see FIG. 3). The controller 11 at S170 executes a preview-option setting processing. Specifically, the controller 11 sets the preview option based on one of the A button 76 and the B button 77 which is selected on the preview-option selection screen 75.

The controller 11 at S180 sets the shortcut to be registered, to the one-touch shortcut. The controller 11 at S190 registers the shortcut with the selected unregistered button. It is noted that the shortcut may be registered using, as a start-off screen, the shortcut screen 80 (see FIG. 3) displayed in response to selection of the Shortcut button 44 on the waiting screen 40. That is, when the unregistered shortcut button is selected on the shortcut screen 80, the controller 11 displays a function selection screen, not illustrated, for selection of a function to be registered. When the function the user wants to register as a shortcut is selected on the function selection screen, the controller 11 displays the setting screen for setting parameters of the selected function. When the copying function is selected on the function selection screen, for example, the controller 11 displays the copy-setting screen 50 illustrated in FIG. 2 as the setting screen. When the Shortcut Registration button 59 is selected after the parameters are set on the setting screen, the controller 11 displays the shortcut-registration confirmation screen 60 (see FIG. 2). When the OK button 61 is selected on the shortcut-registration confirmation screen 60, the controller 11 displays the one-touch-registration confirmation screen 70. After the one-touch-registration confirmation screen 70 is displayed, the controller 11 executes the processings at S130 and subsequent steps.

Shortcut Activating Process

Figure 7:
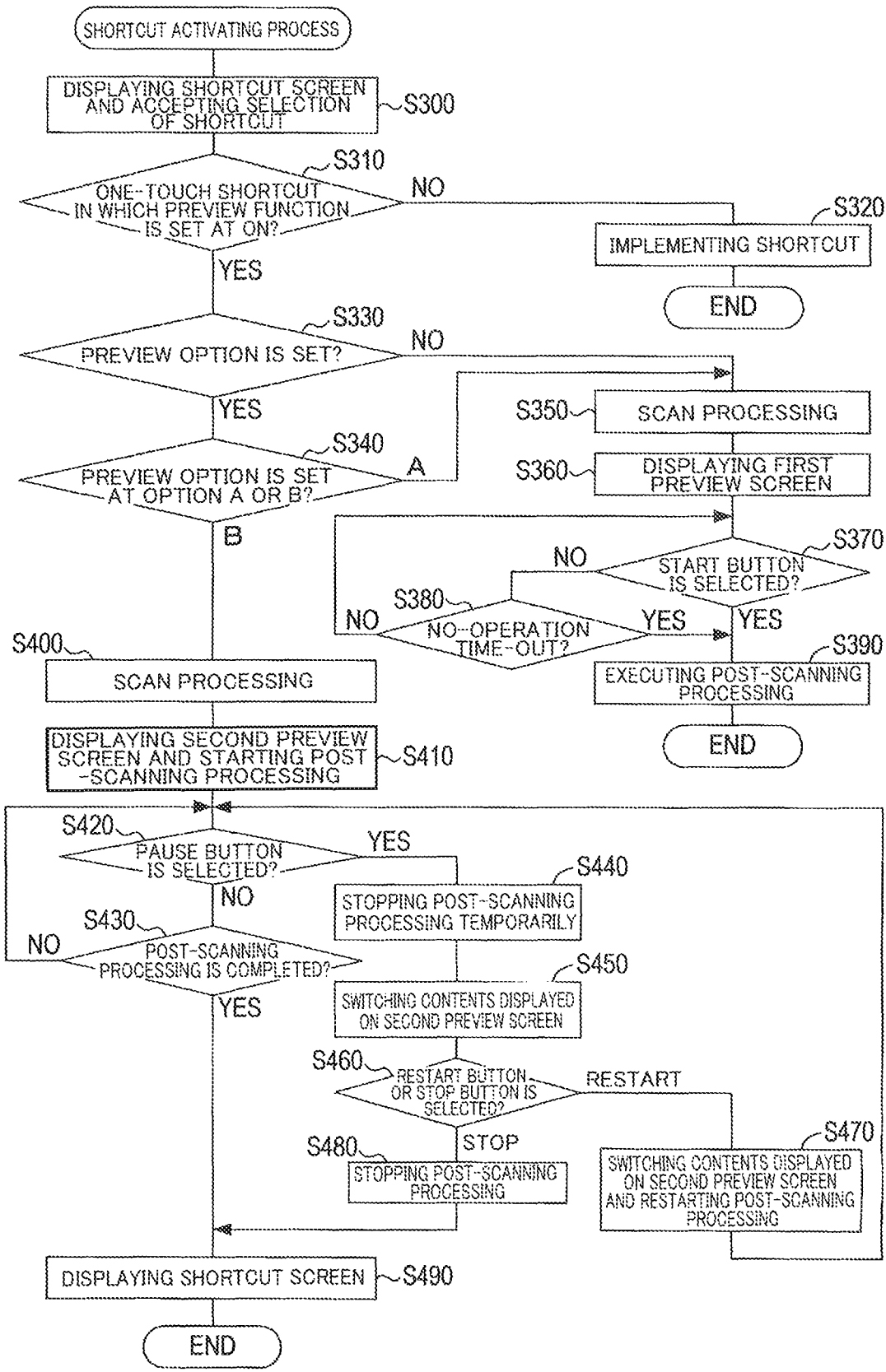
FIG. 7 is a flowchart representing a shortcut activating process.

There will be next described the shortcut activating process executable by the controller 11 with reference to FIG. 7. When the Shortcut button 44 is selected on the waiting screen 40, the controller 11 starts the shortcut activating process in FIG. 7. It is noted that FIG. 7 illustrates the process on the precondition that the shortcut button with which the reading-related shortcut has been registered is selected. The examples of the screen transitions in FIGS. 4 and 5 are implemented by execution of the shortcut activating process by the controller 11.

When the shortcut activating process is started, the controller 11 at S300 displays the shortcut screen 80 on the display device 13 and accepts selection of the shortcut button with which the reading-related shortcut is registered.

The controller 11 at S310 determines whether the reading-related shortcut registered with the shortcut button selected on the shortcut screen 80 is the one-touch shortcut in which the preview function is set at ON. When the reading-related shortcut is the one-touch shortcut in which the preview function is not set at ON, the controller 11 at S320 executes the registered reading-related shortcut. When the one-touch shortcut in which the preview function is set at ON, this flow goes to S330.

The controller 11 at S330 determines whether the preview option is set in the reading-related shortcut registered with the selected shortcut button. When the preview option is not set, this flow goes to S350.

The controller 11 at S350 executes the scan processing. After the completion of the scan processing, the controller 11 at S360 displays the first preview screen 85 (see FIG. 4) on the display device 13. The controller 11 at S370 determines whether the Start button 87 is selected on the first preview screen 85. When the Start button 87 is selected, the controller 11 executes the post-scanning processing at S390.

When the Start button 87 is not selected, this flow goes to S380. The controller 11 at S380 determines whether the no-operation time-out has occurred. When the no-operation time-out has not occurred, this flow goes to S370. When the no-operation time-out has occurred, this flow goes to S390 at which the controller 11 executes the post-scanning processing.

When the controller 11 at S330 determines that the preview option is set, this flow goes to S340. The controller 11 at S340 determines whether the preview option is set at the option A or the option B. When the preview option is set at the option A, this flow goes to S350. When the preview option is set at the option B, this flow goes to S400.

The controller 11 at S400 executes the scan processing. After the completion of the scan processing, the controller 11 at S410 displays the second preview screen 95 (see the lower right region in FIG. 5) on the display device 13 and starts the post-scanning processing.

The controller 11 at S420 determines whether the Pause button 97 is selected on the second preview screen 95. When the Pause button 97 is not selected, the controller 11 at S430 determines whether the post-scanning processing is completed. When the post-scanning processing is completed, this flow goes to S420. When the post-scanning processing is completed, the controller 11 at S490 displays the shortcut screen 80 on the display device 13 to finish the shortcut activating process.

When the controller 11 at S420 determines that the Pause button 97 is selected, the controller 11 temporarily stops the post-scanning processing at S440. The controller 11 at S450 switches the contents displayed on the second preview screen 95. Specifically, as illustrated at the lower left region in FIG. 5, the controller 11 displays the Restart button 102 and the Stop button 103 instead of the Pause button 97 and displays the pause-state message 101 instead of the executing-state message 96.

The controller 11 at S460 determines whether the Restart button 102 or the Stop button 103 is selected. When the Stop button 103 is selected, the controller 11 at S480 completely stops the post-scanning processing temporarily stopped, that is, the controller 11 stops the shortcut being implemented. After the processing at S480, the controller 11 at S490 displays the shortcut screen 80 on the display device 13 and finishes the present shortcut activating process.

When the Restart button 102 is selected, this flow goes to S470. The controller 11 at S470 switches the contents displayed on the second preview screen 95. Specifically, the controller 11 switches the contents displayed at the lower right region in FIG. 5. As a result, the Pause button 97 and the executing-state message 96 are displayed on the second preview screen 95 again. At S470, the controller 11 restarts the post-scanning processing temporarily stopped, and this flow goes to S420.

Effects

In the image processing apparatus 10 according to the embodiment described above, the user can set the preview option in the case where the user registers the reading-related shortcut while setting the preview function at ON.

With this configuration, for example, in the case where a first user wants to instruct the image processing apparatus to start the post-scanning processing after checking the preview image though the first user wants to make the number of operations as small as possible, the first user can set the preview option to the option A to register the reading-related shortcut desired by the first user.

In contrast, for example, in the case where a second user does not want to execute the implementation instruction any more after executing the first implementation instruction, the second user can set the preview option to the option B to register the reading-related shortcut desired by the second user.

Accordingly, it is possible to provide the image processing apparatus 10 with good usability for both the first user and the second user. In the present embodiment, in the case where the preview option is set at the option A, after the first preview screen 85 is displayed, the state of waiting for the start of the post-scanning processing is principally kept until the Start button 87 is selected. However, even in the case where the Start button 87 is not selected, when the no-operation time-out has occurred, the post-scanning processing is started.

Thus, for example, even in the case where the user having instructed the image processing apparatus 10 to implement the shortcut has forgotten the need of selection of the Start button 87 on the first preview screen 85, the post-scanning processing is started at an appropriate timing. This configuration enables the user to appropriately obtain the result of the implementation of the shortcut and reduces an unnecessarily prolonged state in which other users cannot use the image processing apparatus 10.

In the present embodiment, in the case where the preview option is set at the option B, the second preview screen 95 is displayed, and the post-scanning processing is started after the end of the scan processing, but the user can temporarily stop the post-scanning processing by pressing the Pause button 97. Furthermore, the user may restart the post-scanning processing with the Restart button 102 after stopping the post-scanning processing temporarily.

In the present embodiment, each of the shortcut buttons displayed on the shortcut screen 80 contains the normal mark 66 or the one-touch mark 67. This configuration makes it easy for the user to visually recognize whether the shortcut registered with each of the shortcut buttons is registered as the normal shortcut or the one-touch shortcut.

In the shortcut button with which the reading-related shortcut with the preview option set at the option B is registered, the name of the shortcut is displayed in a manner different from that in which other shortcut buttons are displayed. This configuration makes it easy for the user to visually recognize the shortcut button with which the reading-related shortcut with the preview option set at the option B is registered.

In the present embodiment, the shortcut including the scanning function is one example of the reading-related function. The normal shortcut is one example of the reading-related function of a first type. The one-touch shortcut is one example of the reading-related function of a second type. The option A is one example of a first procedure. The option B is one example of a second procedure. The function-start instructing operation on the setting screen displayed in response to selection of the shortcut button (e.g., selection of the B/W Start button 57 or the Color Start button 58 on the copy-setting screen 50) is one example of a start instructing operation. Selection of the Start button 87 on the first preview screen 85 in FIG. 4 is one example of a particular-processing start instruction. The preview-option selection screen 75 is one example of a post-reading-procedure selection screen. The shortcut screen 80 is one example of a function selection screen. The registered shortcut button on the shortcut screen 80 is one example of an icon. The display manner of the name of the shortcut on the shortcut button 65*b* with which the reading-related shortcut with the preview option set at the option B is registered is one example of identification information.

The processing at S110 is one example of a registration processing. The processings at S350 and S400 are one example of a reading processing. The post-scanning processing at S390 and S410 is one example of a particular processing. The processings at S120 and S130 are one example of a type setting processing. The processing at S160 is one example of a procedure-selection display processing. The processing at S170 is one example of a post-reading-procedure setting processing. The processing at S300 is one example of a function-selection-screen display processing and a first accepting processing. The shortcut activating process in FIG. 7 is one example of a function implementing processing. The processing at S360 is one example of a first-preview-screen display processing. The processing at S370 is one example of a second accepting processing. The processing at S390 is one example of a first particular-processing start processing and a no-instruction start processing. The processing at S410 is one example of a second preview-screen display processing and a second particular-processing start processing. The processing at S440 is one example of a temporarily-stopping processing. The processing at S450 is one example of a restart-button display processing. The processing at S470 is one example of a restart processing.

Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure.

The display manner allowing the user to visually recognize whether the preview option in the shortcut button is set at the option A or the option B may be a display manner different from a manner in which the font of the name of the shortcut varies. In one example, the color of the name of the shortcut may vary with the preview option. In another example, the color of the shortcut button may vary with the preview option.

In the case where the preview option is set at the option B, the image processing apparatus 10 may be configured to wait until a particular length of time has elapsed after the second preview screen 95 is displayed, without starting the post-scanning processing immediately after the end of the scan processing, and start the post-scanning processing after the particular length of time has elapsed.

With this configuration, if the scan processing is not executed normally, and the user having viewed the preview image 86 recognizes the abnormal scan processing, the reading-related shortcut being implemented can be stopped completely before the start of the post-scanning processing.

The reading-related shortcut is not limited to the shortcut for the copying function. For example, other functions requiring the scan processing, such as the scanning function and the facsimile function may be registered as the reading-related shortcut.

The plurality of functions of one element in the above-described embodiment may be achieved by a plurality of elements, and one function of one element may be achieved by a plurality of elements. A plurality of functions of a plurality of elements may be achieved by one element, and one function achieved by a plurality of elements may be achieved by one element. The configurations in the above-described embodiment may be omitted partly. At least a portion of the configurations in the above-described embodiment may be added to or replaced with another portion of the configurations in the above-described embodiment.

What is claimed is:

1. An image processing apparatus, comprising:
    a reading device;
    a display device;
    an input interface; and
    a controller configured to execute:
        a type setting processing in which the controller sets a type of a reading-related function to be performed according to a set parameter, to one of a first type and a second type, the first type being a type in which the reading-related function is to be started in response to acceptance of a start instruction for the reading-related function via the input interface after an input of selection of the reading-related function to be performed, the second type being a type in which the reading-related function is to be started without accepting the start instruction via the input interface after the input of the selection of the reading-related function to be performed;
        a procedure-selection display processing in which when the second type is set in the type setting processing, the controller controls the display device to display a procedure-selection screen prompting for selection of one of a first procedure and a second procedure as an execution procedure that is a procedure of execution of a processing after reading of an image is started in performing of the reading-related function;
        a procedure setting processing in which the controller sets the execution procedure to one of the first procedure and the second procedure in accordance with a selecting operation input via the input interface when the procedure-selection screen is displayed; and
        a registration processing in which the controller registers the reading-related function, the reading-related function comprising (i) a setting processing in which the controller sets a parameter to be implemented in the reading-related function, (ii) a reading processing in which the reading device reads the image, and (iii) a particular processing based on data representing a read image that is the image read in the reading processing,
    wherein the first procedure is a procedure in which the controller controls the display device to display a first preview screen containing the read image, and the image processing apparatus starts the particular processing when a particular-processing start instruction for instructing a start of the particular processing is accepted via the input interface with the first preview screen being displayed, and
    wherein the second procedure is a procedure in which the controller controls the display device to display a second preview screen containing the read image, and the image processing apparatus starts the particular processing without accepting the particular-processing start instruction via the input interface.

2. The image processing apparatus according to claim 1, wherein the controller is configured to execute:
    a first accepting processing in which the controller accepts an input of the selection of the reading-related function to be performed; and
    a function implementing processing in which when the input of the selection is accepted in the first accepting processing, the image processing apparatus performs the reading-related function according to the set type, and when the second type is set, the image processing apparatus further performs the reading-related function by following the set execution procedure.

3. The image processing apparatus according to claim 2, wherein the input of the selection which is accepted in the first accepting processing is accepted before a start of reading of the image by the reading device in the reading-related function, and
    wherein the reading of the image by the reading device in the reading-related function is started when the input of the selection is accepted.

4. The image processing apparatus according to claim 2, wherein the function implementing processing comprises, as processings to be executed when the second type is set, and the first procedure is set as the execution procedure:
    a first-preview-screen display processing in which the controller controls the display device to display the first preview screen;
    a second accepting processing in which the controller accepts the particular-processing start instruction via the input interface when the first preview screen is displayed; and
    a first particular-processing start processing in which the controller starts the particular processing when the particular-processing start instruction is accepted in the second accepting processing.

5. The image processing apparatus according to claim 4, further comprising a printing device,
    wherein the particular-processing start instruction accepted in the second accepting processing is accepted after a start of reading of the image by the reading device in the reading-related function, and
    wherein printing of an image by the printing device as the particular processing is started when the particular-processing start instruction is accepted.

6. The image processing apparatus according to claim 4, wherein the function implementing processing further comprises a no-instruction start processing in which the controller starts the particular processing when a particular length of time has elapsed without accepting the particular-processing start instruction in the second accepting processing after the first preview screen is displayed in the first-preview-screen display processing.

7. The image processing apparatus according to claim 2, wherein the function implementing processing comprises, as processings to be executed when the second type is set, and the second procedure is set as the execution procedure:

a second preview-screen display processing in which the controller controls the display device to display the second preview screen; and a second particular-processing start processing in which the controller starts the particular processing without a need of an operation via the input interface in a state in which the second preview screen is displayed.

8. The image processing apparatus according to claim 7, wherein the second preview screen contains a pause button for temporarily stopping the particular processing, and wherein the function implementing processing further comprises a temporarily-stopping processing in which the controller temporarily stops the particular processing when the pause button is selected via the input interface in the state in which the second preview screen is displayed.

9. The image processing apparatus according to claim 8, wherein the function implementing processing further comprises:

a restart-button display processing in which the controller displays a restart button on the second preview screen instead of the pause button when the particular processing is temporarily stopped in the temporarily-stopping processing; and a restart processing in which the controller restarts the particular processing when the restart button is selected via the input interface.

10. The image processing apparatus according to claim 2, wherein the controller is configured to execute a function-selection-screen display processing in which the controller controls the display device to display a function selection screen containing an icon with which the reading-related function registered in the registration processing is associated, wherein the controller is configured to, in the first accepting processing, accept an operation of selecting the icon on the function selection screen via the input interface, as the input of the selection of the reading-related function to be performed, wherein the image processing apparatus is configured to, in the function implementing processing, perform the reading-related function with which the icon selected in the first accepting processing is associated, and wherein when the type of the reading-related function corresponding to the icon is set at the second type, the icon contains identification information allowing visual recognition of whether the execution procedure is set at the first procedure or the second procedure.

11. An image processing method usable for an image processing apparatus, the image processing method comprising:

a type setting step of setting a type of a reading-related function to be performed according to a set parameter, to one of a first type and a second type, the first type being a type in which the reading-related function is to be started in response to acceptance of a start instruction for the reading-related function after an input of selection of the reading-related function to be performed, the second type being a type in which the reading-related function is to be started without accepting the start instruction after the input of the selection of the reading-related function to be performed;

a procedure-selection display step of, when the second type is set in the type setting step, displaying a post-reading-procedure selection screen prompting for selection of one of a first procedure and a second procedure as an execution procedure that is a procedure of execution of a processing after reading of an image is started in performing of the reading-related function;

a post-reading-procedure setting step of setting the execution procedure to one of the first procedure and the second procedure in accordance with a selecting operation input when the post-reading-procedure selection screen is displayed; and a registration step of registering the reading-related function, the reading-related function comprising (i) a setting processing for setting a parameter to be implemented in the reading-related function, (ii) a reading processing for reading the image, and (iii) a particular processing based on data representing a read image that is the image read in the reading processing, wherein the first procedure is a procedure of displaying a first preview screen containing the read image, and starting the particular processing when a particular-processing start instruction for instructing a start of the particular processing is accepted with the first preview screen being displayed, and wherein the second procedure is a procedure of displaying a second preview screen containing the read image, and starting the particular processing without accepting the particular-processing start instruction.

12. A non-transitory storage medium storing a plurality of instructions executable by a processor of an image processing apparatus comprising a reading device, a display device, and an input interface, the plurality of instructions, when executed by the processor, causing the image processing apparatus to execute:

a type setting processing in which the image processing apparatus sets a type of a reading-related function to be performed according to a set parameter, to one of a first type and a second type, the first type being a type in which the reading-related function is to be started in response to acceptance of a start instruction for the reading-related function via the input interface after an input of selection of the reading-related function to be performed, the second type being a type in which the reading-related function is to be started without accepting the start instruction via the input interface after the input of the selection of the reading-related function to be performed;

a procedure-selection display processing in which when the second type is set in the type setting processing, the image processing apparatus controls the display device to display a procedure-selection screen prompting for selection of one of a first procedure and a second procedure as an execution procedure that is a procedure of execution of a processing after reading of an image is started in performing of the reading-related function;

a procedure setting processing in which the image processing apparatus sets the execution procedure to one of the first procedure and the second procedure in accordance with a selecting operation input via the input interface when the procedure-selection screen is displayed; and a registration processing in which the image processing apparatus registers the reading-related function, the reading-related function comprising (i) a setting processing in which the image processing apparatus sets a parameter to be implemented in the reading-related function, (ii) a reading processing in which the reading device reads the image, and (iii) a particular processing based on data representing a read image that is the image read in the reading processing, wherein the first procedure is a procedure in which the image processing apparatus controls the display device to display a first preview screen containing the read image, and the image processing apparatus starts the particular processing when a particular-processing start instruction for instructing a start of the particular processing is accepted via the input interface with the first preview screen being displayed, and wherein the second procedure is a procedure in which the image processing apparatus controls the display device to display a second preview screen containing the read image, and the image processing apparatus starts the particular processing without accepting the particular-processing start instruction via the input interface.

* * * * *